J. F. MacINDOE.
LUBRICATOR.
APPLICATION FILED DEC. 21, 1917.

1,283,841.

Patented Nov. 5, 1918.
2 SHEETS—SHEET 1.

WITNESSES:
Wm. Eberle.
G. N. Larer.

INVENTOR
JOHN F. MAC INDOE
BY
M. van Bosskirk
his ATTORNEY

J. F. MacINDOE.
LUBRICATOR.
APPLICATION FILED DEC. 21, 1917.

1,283,841.

Patented Nov. 5, 1918.
2 SHEETS—SHEET 2.

Witnesses

Inventor
John F. MacIndoe
his Attorney

UNITED STATES PATENT OFFICE.

JOHN FRANKLIN MacINDOE, OF PHILADELPHIA, PENNSYLVANIA, ASSIGNOR TO FRANKLIN BRASS MANUFACTURING COMPANY, OF PHILADELPHIA, PENNSYLVANIA, A CORPORATION OF PENNSYLVANIA.

LUBRICATOR.

1,283,841.      Specification of Letters Patent.      Patented Nov. 5, 1918.

Application filed December 21, 1917. Serial No. 208,223.

*To all whom it may concern:*

Be it known that I, JOHN FRANKLIN MACINDOE, a citizen of the United States, residing at Philadelphia, in the county of Philadelphia and State of Pennsylvania, have invented certain new and useful Improvements in Lubricators, of which the following is a specification.

My invention relates to grease cups or lubricators of the type from which the lubricant is automatically ejected by means of pressure applied thereto and which are particularly applicable for use on the bearings of automobiles.

The present inefficient method of employing hand compression grease cups on the outside bearings of automobiles is detrimental to the car and a source of annoyance to the operator and results in more quickly worn bearings, undue friction and by reason of the operator neglecting to properly lubricate the various bearings on account of the mud incrusted threads thereon and because of the manual labor required to deliver the contents of the cup, serious injury to the mechanical operation of the car is sustained, as well as an increased cost of maintenance.

The objects of my invention are to eliminate, or reduce to a great extent, the injuries or losses due to the neglect to properly lubricate bearings by the hand method in vogue and to provide the operator with a device that will deliver the entire contents of the cup with but one adjustment, namely, adjusting the cap or cover in operative position which will cause the lubricant to be delivered as required until the cup is emptied by reason of sufficient spring pressure thereon; also to deliver a constant and uniform flow or movement of the lubricant to the bearing. The cup will not flood at the beginning of the stroke because of the unique and novel control means attached to the plunger and which operates in the shank of the device. These and other objects I attain in the manner hereinafter set forth, reference being had to the accompanying drawings, in which—

Similar reference characters refer to similar parts throughout the drawings.

Figure 1:
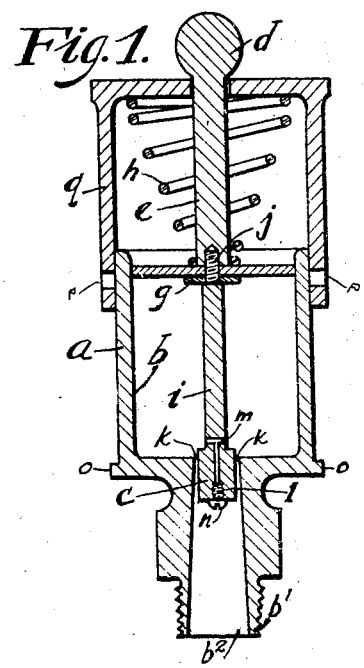
Figure 1 is a vertical sectional view of my device illustrating the cap or cover in position to be secured and fastened in place.
Figure 2:
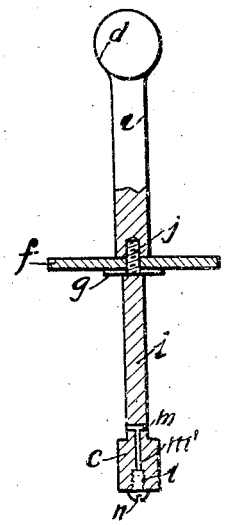
Fig. 2 is a vertical sectional view of the spring actuated piston or plunger.
Figure 3:
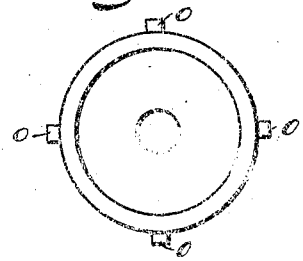
Fig. 3 is a plan view of the bottom of the cup, illustrating the keeper or holder pins thereon.
Figure 4:
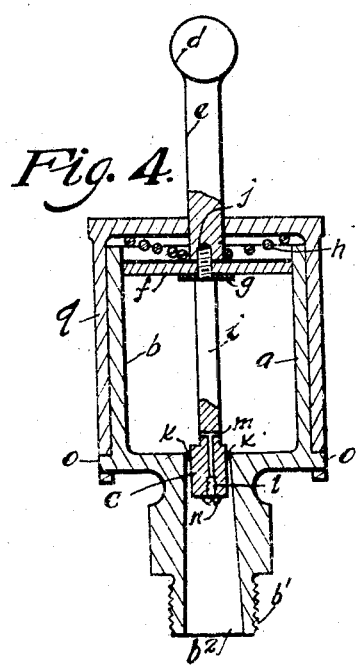
Fig. 4 is a vertical sectional view of my device illustrating the cap or cover adjusted and secured in operative position.
Figure 5:
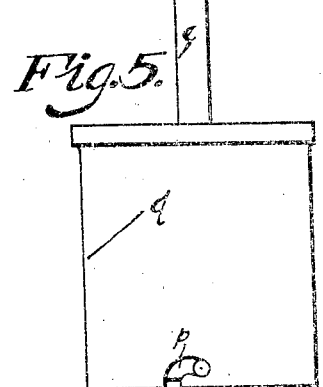
Fig. 5 is a vertical sectional view of the cap or cover showing an offset and seat to secure same in operative position on the cup.

Referring to the drawings in detail the letter $a$ designates the body or barrel of my grease cup, nominally of such size and dimensions as are used for automobile lubricating purposes, the interior portion $b$ thereof comprising a receptacle for the lubricant. Said body $a$ terminates in a shank $b'$ in which is formed the tapering valve-controlled outlet passage $h$ of the cup, having recesses or slots $p$ to engage pins $o$ which are formed on and integral with the base of said body or barrel $a$ of the cup.

A cap or cover $q$ is provided to fit slidingly over the barrel $a$ and has a suitable opening to permit of the stem $e$ passing therethrough, as illustrated.

The stem $e$ is formed with a top $d$ preferably ball-shaped as illustrated, and is drilled and threaded centrally at its base to receive the threaded end $j$ of the control valve stem $i$.

A plunger $f$ is held in position by the engagement of the control valve stem $i$ with the stem $e$. As the stem $i$ is screwed into the threaded portion of the stem $e$ it holds the plunger $f$ securely making the three parts one operative unit. The said piston or plunger $f$ being provided with a suitable opening for the passage of the threaded end of the stem *i*. A washer *g* is provided as shown to firmly hold the parts in alinement.

Figure 8:
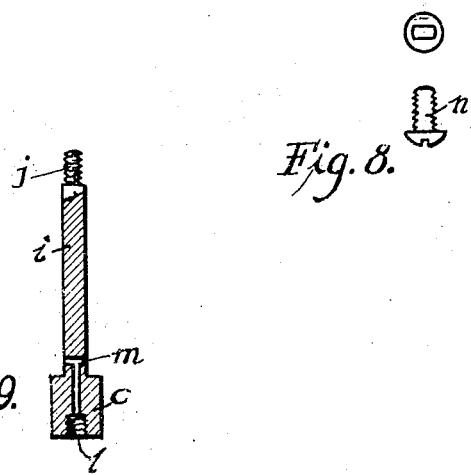
Fig. 8 is a detailed view of a flat sided screw used in increasing the flow of the lubricant.

The control valve stem *i* terminates in a cylindrical member *c*, which member *c* has the vertical port *m'* communicating with the horizontal port *m'*. The vertical port *m'* terminating in the threaded portion *l*, is regulated by means of the flat sided screw *n*, more particularly illustrated in Fig. 8.

The cap or cover *q* is slid over the barrel *a* until it reaches the pins *o* which are cast, or formed, integral with the base of said barrel *a*. Said cap is then turned until the slots *p* register with the pins *o*; the cap is then pressed downwardly until the pin *o* reaches the upper edge of the slot *p*; the cap is then again turned until the said pin *o* pockets at the extreme end of the slot *p*, locking the cap or cover *q* firmly and securely in place. The cap or cover *q* is provided with a suitable compression spring *h*, of sufficient expansive strength to clear the cup of the lubricant, which actuates the plunger *f* and furnishes tension to hold said cover more securely in engagement with the pins *o*.

The shank *b'* is formed with the tapered outlet *k* which runs through its entire length, gradually increasing in diameter from the upper to the lower extremity thereof, providing a gradually increasing area for the flow of the lubricant after the control valve has descended approximately one-fourth the length of its stroke, the area increasing in proportion to the weakening of one spring *h* insuring a uniform flow of lubricant from the outlet of the cup. The shank *b'* is exteriorly threaded at its lower extremity.

There is thus obtained a constant and uniform flow or movement of lubricant to the bearing controlled by the valve which for the distance or length of its plug or member *c* controls the excess pressure part of the stroke, and after this part of the stroke is complete the upper edge of the member *c* begins to descend into the tapered part of the shank and from this point, approximately, until the stroke is complete and the cup empty, the outlet area will be gradually increased as the spring weakens by the continued increase in the length of the stroke.

The operation of the device is as follows: The barrel *a* is filled with lubricant; the cap or cover *q* containing the plunger *f*; which at this time is at its extreme down stroke or on a level with the outlet or lower part of the cover *q* and the spring *h* is expanded to full stroke length, is slid over the upper or open end of the barrel *a* which causes the plunger *f* to enter the interior of the barrel *a* and in contact with the lubricant. As the cover *q* is forced downwardly, the plunger *f* is forced upwardly compressing the spring *h*. The cover *q* is then forced downwardly until its lower edge contacts with the pins *o*. It is then forced downwardly until the slots *p* register with the pins *o* and then turned until said pins *o* pocket in the offset portion of the slots *p*, which slots are preferably round. The cap or cover will then be in its locked position, the piston in its uppermost position, the spring compressed, the control valve in position and the cup is ready to deliver the lubricant in the manner claimed. The expansion of the spring *h* gradually displaces the lubricant in such amount as is regulated by the operation of the control valve within the shank, being gradually tapered, the smaller end next to the grease and the larger or wider part at the outlet. When the ball shaped indicator *d* rests on the cover *q* it is an indication that the stroke of the plunger *f* has been completed and that the cup is empty.

The function of the control valve is as follows: When the plunger of a spring actuated piston begins the downward stroke its strongest point of expansion is during the first quarter of the stroke and unless the outlet is throttled the result will be an excess delivery of lubricant during the first part of the stroke. As the plunger descends the spring weakens and the flow of lubricant diminishes proportionately.

The method used in the usual type of spring compression grease cups is to regulate the flow of lubricant by means of a small screw placed through the shank outlet, and this screw requires constant human attendance if a uniform lubricant delivery is maintained. The apparent impracticability of this method is obvious when the operator's attention is required on a number of cups; hence an unusual waste of lubricant and spasmodic applications thereof, resulting in a constantly fluctuating of friction, lower at times when flooded and higher when the operator is delayed or neglects to release the thumb screw; thus the bearing is deprived of the necessary amount of lubricant and increased friction develops.

To increase the flow of the lubricant, if desired, the flat sided screw *n* is loosened which permits the lubricant to flow past the flat side thereof and out between the head of the screw and the bottom of the control valve *c*.

The spring *h* exerts an upward force as well as a downward one and this tends to hold the cover from disengagement from the body of the cup.

Figure 6:
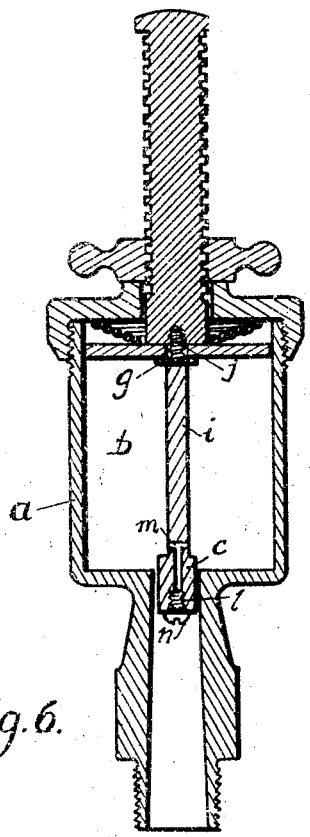
Fig. 6 is a vertical sectional view of the usual type of grease cup, before compression, with my spring actuated piston or plunger in position.
Figure 7:
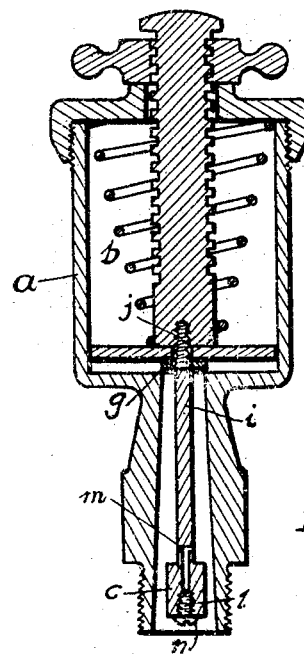
Fig. 7 is a vertical sectional view of the usual type of grease cup, after compression, with my spring actuated piston or plunger in position.
Figure 9:
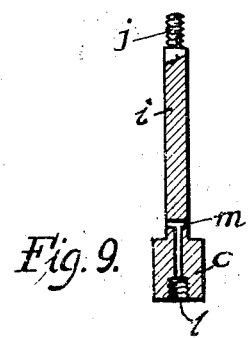
Fig. 9 is a vertical sectional view of my control valve.

In Figs. 6 and 7 I have illustrated my control valve in connection with the usual type of thumb screw lubricator.

Having thus described my invention what I claim as new and desire to secure by Letters Patent is

1. The combination of a lubricating cup having a spring actuated plunger, a valve stem operatively secured thereto, a cylindrical plug member secured to the lower extremity of said stem and adapted to fit snugly within the opening of the shank, a shank having a continuously tapering outlet the taper thereof extending throughout the entire length of said shank and gradually increasing in diameter from the upper to the lower extremity thereof providing a gradually increasing area for the flow of the lubricant, after the plug member has descended substantially its own length within said shank, in proportion to the weakening of the pressure means.

2. The combination of a lubricating cup having a spring actuated plunger, a valve stem operatively secured thereto terminating in a cylindrical plug member adapted to fit snugly within the opening of the shank, a shank having a continuously tapering outlet the taper thereof extending throughout the entire length of said shank gradually increasing in diameter from the upper to the lower extremity thereof providing a gradually increasing area for the flow of the lubricant, after the plug member has descended substantially its length within said shank, in proportion to the weakening of the pressure means and means to increase the flow of the lubricant.

3. The combination of a lubricating cup having a spring actuated plunger, a valve stem operatively secured thereto terminating in a cylindrical plug member adapted to fit snugly within the opening of the shank, a shank having a continuously tapering outlet the taper thereof extending throughout the entire length of said shank and gradually increasing in diameter from the upper to the lower extremity thereof providing a gradually increasing area for the flow of the lubricant, after the plug member has descended substantially its length within said shank, in proportion to the weakening of the pressure means, the length of said plug member being proportioned so that until it has entirely entered within the shank it equalizes the initial excess pressure of the pressure means.

4. The combination of a lubricating cup having a spring actuated plunger, a valve stem operatively secured thereto, a cylindrical plug member secured to the lower extremity of said stem and adapted to fit snugly within the opening of the shank, said plug member being provided with a horizontal port and a vertical port communicating therewith, a shank having a continuously tapering outlet the taper thereof extending throughout the entire length of said shank and gradually increasing in diameter from the upper to the lower extremity thereof providing a gradually increasing area for the flow of the lubricant, after the plug member has descended substantially its length within the shank, in proportion to the weakening of the pressure means, and means to increase the flow of the lubricant.

5. The combination of a lubricating cup having a spring actuated plunger, a cover slidably mounted on said cup, a stem, passing through an opening in said cover, provided with a ball shaped top, a control valve stem, means for connecting said stems, said control valve stem terminating in a cylindrical plug member adapted to fit snugly in the opening in the shank, a shank having a continuously tapering outlet the taper thereof extending throughout the entire length of said shank and gradually increasing in diameter from the upper to the lower extremity thereof providing a gradually increasing area for the flow of the lubricant, after the plug member has descended substantially its length within the shank, in proportion to the weakening of the pressure means, and providing means to indicate the volume of lubricant within the cup.

In testimony whereof I affix my signature in presence of two witnesses.

JOHN FRANKLIN MacINDOE.

Witnesses:
 Wm. H. Lawrence,
 Mahlon Van Booskirk.